United States Patent [19]

Dan et al.

[11] Patent Number: 5,768,681
[45] Date of Patent: Jun. 16, 1998

[54] CHANNEL CONSERVATION FOR ANTICIPATED LOAD SURGE IN VIDEO SERVERS

[75] Inventors: Asit Dan, West Harrison; Perwez Shahabuddin, White Plains; Dinkar Sitaram, Yorktown Heights; William H. Tetzlaff, Mount Kisco, all of N.Y.

[73] Assignee: International Business Machines Corporation, Armonk, N.Y.

[21] Appl. No.: 517,642

[22] Filed: Aug. 22, 1995

[51] Int. Cl.⁶ ............................... H04H 1/00; H04N 7/14
[52] U.S. Cl. ....................... 455/5.1; 548/7; 548/12; 455/4.2
[58] Field of Search .................. 395/200.47, 200.48, 395/200.49; 348/6, 7, 12, 13; 455/3.1, 4.1, 4.2, 5.1, 6.1; H04N 7/10, 7/14, 7/173

[56] References Cited

U.S. PATENT DOCUMENTS

| | | | |
|---|---|---|---|
| 5,561,456 | 10/1996 | Yu | 348/7 |
| 5,586,264 | 12/1996 | Belknap et al. | 395/200.08 |
| 5,631,694 | 5/1997 | Aggarwal et al. | 348/7 |

FOREIGN PATENT DOCUMENTS

| | | | |
|---|---|---|---|
| 0 617 563 A1 | 3/1994 | European Pat. Off. | H04N 7/173 |
| 0 673 159 A1 | 3/1995 | European Pat. Off. | H04N 7/00 |
| 0 673 160 A1 | 3/1995 | European Pat. Off. | H04N 7/00 |
| 0 696 872 A2 | 7/1995 | European Pat. Off. | H04N 7/173 |
| 0 673 160 A | 9/1995 | European Pat. Off. | |

OTHER PUBLICATIONS

IEEE Multimedia 1 (1994) Fall, No. 3, New York, US, "Prospects for Interactive Video–On–Demand", Thomas D.C. Little and Dinesh Venkatesh, pp. 14–24.

Proceedings of First ACM International Conference on Multimedia, 2–6 Aug. 1993, Anaheim, CA, US, 15 Oct. 1994, XP000577549, "Scheduling Policies for an On–Demand Video Server with Batching", A. Dan, et al., pp. 15–23.

Primary Examiner—Mark R. Powell
Assistant Examiner—John W. Miller
Attorney, Agent, or Firm—Richard M. Ludwin; Kevin M. Jordan

[57] ABSTRACT

A system and method for scheduling the number of channels in video-on-demand servers so as to deal with time varying load. The scheduling process is hierarchical. A higher level scheduler controls the rate of channel consumption based on anticipated load, and a lower level scheduler selects the waiting client requests to be served when a channel is allocated by the higher level scheduler.

20 Claims, 6 Drawing Sheets

CHANNEL CONSERVATION FOR ANTICIPATED LOAD SURGE IN VIDEO SERVERS

I. BACKGROUND OF THE INVENTION a. Field of the Invention

The present invention relates to a video on demand system of the type wherein multiple clients are serviced by video streams delivered from a video server.

b. Related Art

Video-on-demand (VOD) servers commonly include a group of centralized servers that store a large number of videos on disks and play these videos to widely distributed clients. Unlike conventional applications, VOD applications have hard real-time response requirements to ensure a continuous delivery of data to the clients. Hence video servers have to implement reservation of sufficient resources both at the server and in the network to guarantee uninterrupted delivery of a video stream. These resources are referred to as a channel.

In general, clients request videos independently of each other. A new stream may be started to satisfy each request if enough resources are available. However, multiple requests for the same video can be served by a single disk I/O stream by sending the same data pages to multiple clients. This is referred to as batching. The batching factor is the average number of requests batched together.

In VOD systems, the load may be transient in nature. For example, the rate of requests may start going up at 6 PM, peak at 8 PM and again subside after 10 PM. During periods of high load, it is likely that there will be multiple requests for the popular movies within a short period of time that can be batched together. Batching is thus mostly useful during periods of high load. During periods of low load, it may be preferable to allocate an individual stream for each movie or to have a lower batching factor. Due to the long viewing times of videos, it is possible that channels allocated during periods of low load are not available during the peak period. Thus sufficient channels may not be available during the peak period to service the load.

II. SUMMARY OF THE INVENTION

In view of the above, a system, method and computer program product are provided for scheduling the number of channels in video-on-demand servers so as to deal with a time varying load. In accordance with an aspect of the present invention a method is provided for scheduling videos in a video-on-demand system. Requests (from users) are received for playing of videos. A time for a next playing of a video by the video-on-demand system is determined based on present availability of system resources and anticipated load on the system. Also, particular video to play is selected from those requested, based at least in part on attributes of the requests which have not yet been serviced. After the video is selected and when the time for the next playing arrives, the particular video is played to service at least some of the requests.

In a preferred embodiment, the scheduling process is hierarchical. A higher level scheduler controls the rate of channel consumption based on anticipated load, and a lower level scheduler selects the waiting client requests to be served when a channel is allocated by the higher level scheduler. Thus, system resources are conserved at the time of low load by rejecting client requests or delaying playback of videos to increase the batching factor in anticipation of higher load in the near future.

III. BRIEF DESCRIPTION OF THE DRAWINGS

IV. DETAILED DESCRIPTION OF A PREFERRED EMBODIMENT

Figure 1:
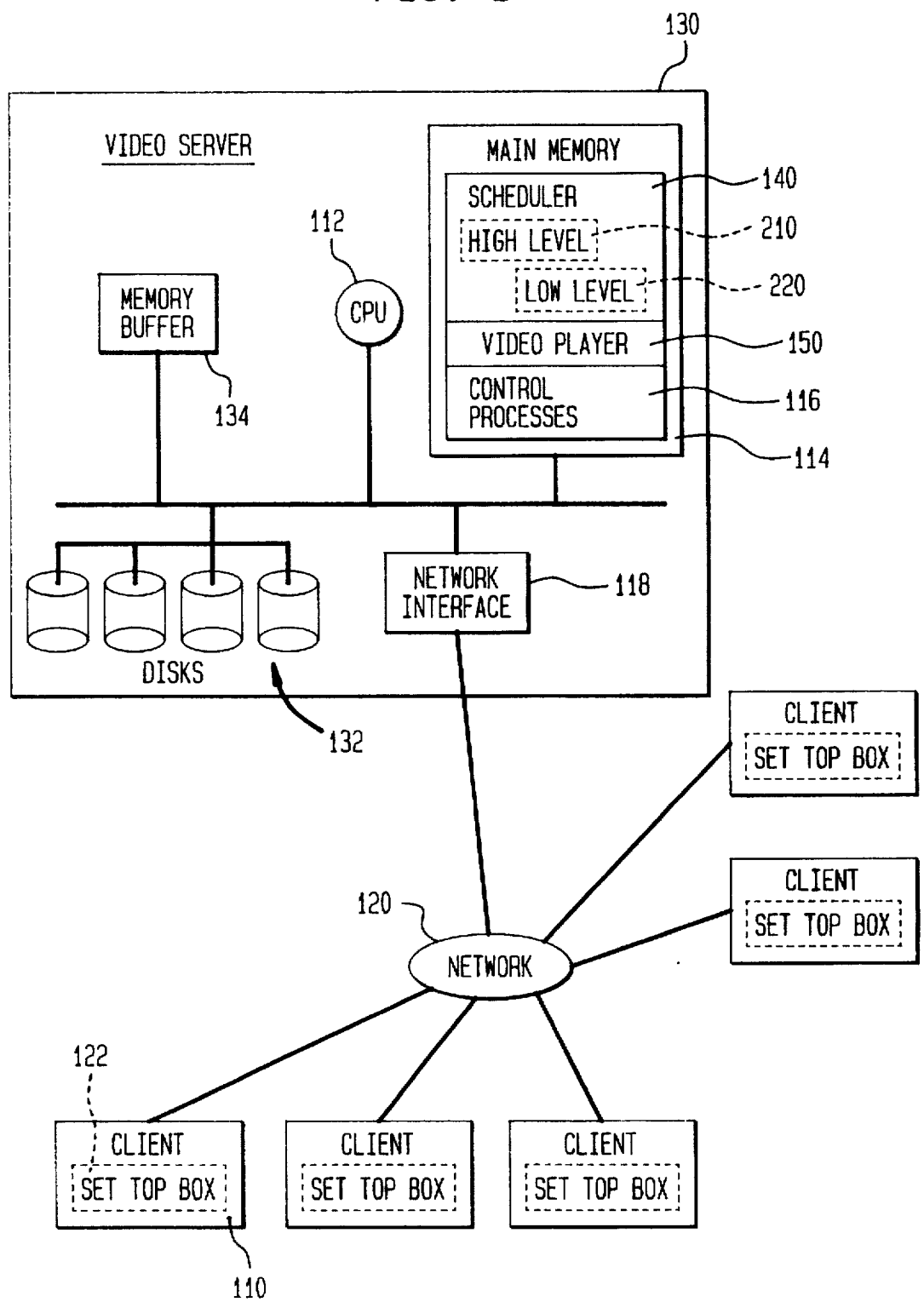
FIG. 1 is a block diagram of a video-on-demand system according to an embodiment of the present invention.

FIG. 1 is a block diagram of a video-on-demand system according to an embodiment of the present invention. The video-on-demand system includes a video server 130, wherein videos (e.g. movies) are stored in storage devices such as a disk array 132. The video server 130 is coupled to a communication network 120 by way of conventional network interface 118. Clients 110 make requests to the video server 130 via the communication network 120. Clients can submit start, stop, pause and resume requests by way of client stations 122. In order to facilitate batching, VCR control and other functions, the requested videos (or segments of the requested videos) are loaded into a memory buffer 134 from the disks 132 and then served to the clients via the buffer 134.

The video server 130 includes a processor (cpu) 112 which performs under control of the various programs residing in a main memory 114. These programs include a scheduler 140 that reserves a channel (i.e., resources) before the start of video playback, and a video player 150 that can start, stop, pause and resume of video playback upon client request after the scheduler makes a channel available. Those of skill in the art will recognize that a number of conventional software processes 116, not described in detail here, are also involved in the control and support of the video server functions.

The video server 100 can be embodied using any processor of sufficient performance for the number of video streams to be supported. For example, a small capacity video server could be embodied using a RISC System/6000 TM system while a larger capacity server could be embodied using an ES/9000 TM system (both available form International Business Machines Corporation of Armonk, N.Y.). This disks 132 can be embodied as any conventional disk subsystem or disk array. The communication network 120 can be, for example, a fiber optic network or a conventional bidirectional cable network. The client stations 122 can be embodied, for example, as a set-top box.

Figure 2:
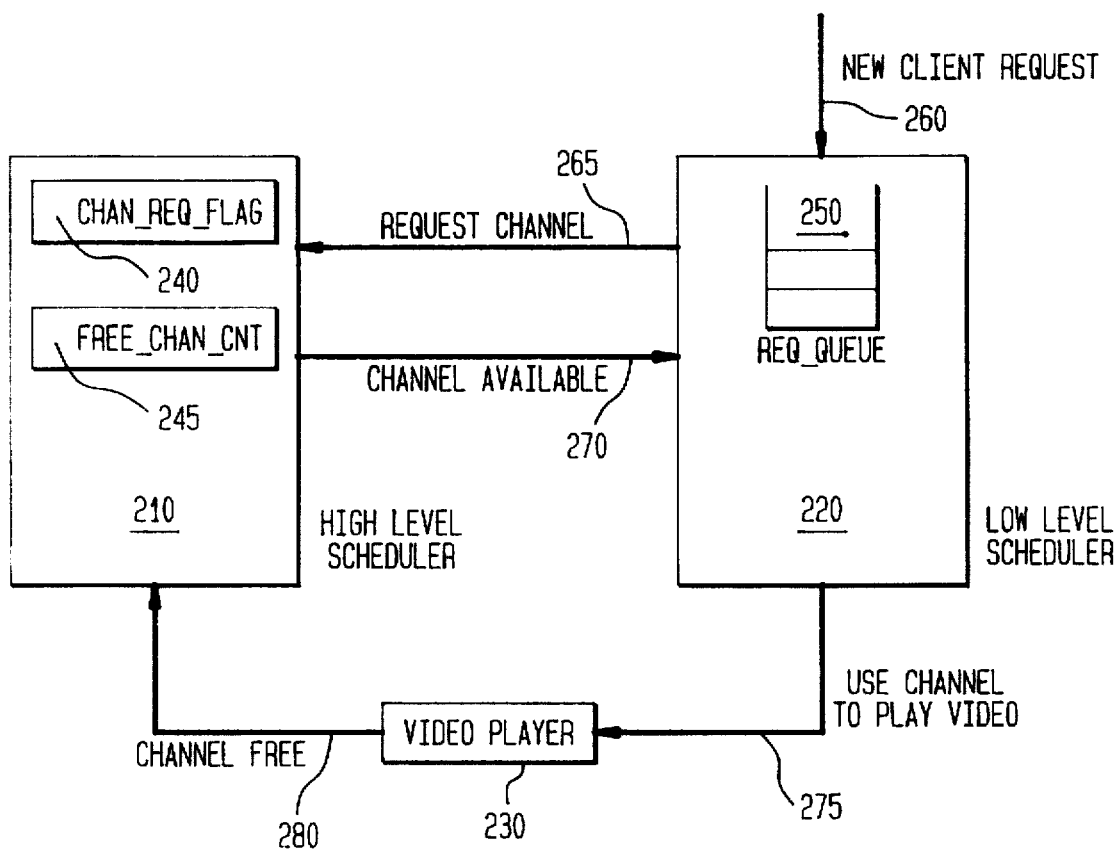
FIG. 2 is a block diagram of the scheduler of FIG. 1.

FIG. 2 shows the components of the scheduler 140 of FIG. 1, and their interactions with the video player 150 of FIG. 1. The scheduler includes two components, a High Level Scheduler (HLS) 210 and a Low Level Scheduler (LLS) 220. The HLS and the LLS are embodied as program code and associated data structures instantiated in the memory of the server. Signaling between the HLS and LLS and between the schedular and other modules is accomplished by setting and resetting flags or status bits indicative of various conditions and requests.

The HLS 210 maintains a flag 240 called CHAN_REQ_FLAG and a counter for the number of free channels, FREE_CHAN_CNT 245. Client requests for the start of a new video 260 are queued in the REQ_QUE 250 of the LLS 220. The LLS 220 sends "Request channel" signal 265 to the HLS to schedule waiting client requests for start of a new video. The HLS 210 sends signal "Channel available" back to LLS 220 once it allocates a channel. The LLS 220 then selects a video to play and batches all waiting client requests for that video. It then sends the signal "Use channel to play video" to the Video Player 230.

The selection of which video to play depends on various attributes of the client requests waiting in the queue, policy objectives as well as the supported service class. Client request attributes include, for example, the amount of time each client has waited, their reneging time threshold (how long each client is expected to be willing to wait), and the service time requirement for the video (i.e. how long the system resources are expected to be needed for playing of the video). The policy objective can be, for example, to minimize overall reneging, fairness or prioritizing one class of requests over others. For example one requestor might received deluxe or preferred class service for a higher fee and thus be served on a priority basis.

A particular embodiment of the LLS policy is FCFS (first come first serve). In accordance with FCFS, the request in the front of the queue is served first and all other clients waiting for the same video are batched together when the request is serviced. Thus, FCFS schedules videos based on the attributes of (1) position in the queue and (2) which video has been requested. Special treatment can be given to "hot" (popular) videos. In accordance with this policy (sometimes referred to as FCFS-n), hot videos are served from special queue provided for that purpose.

Like the schedular 140, the Video Player 230 is embodied as program code and data structures instantiated in the memory of the video server. The Video player 230 pauses, resumes and stops playback of videos upon corresponding client requests. After the playback of a video is stopped the Video Player 230 sends the signal "Channel free" 280 to the HLS 210.

Figure 3:
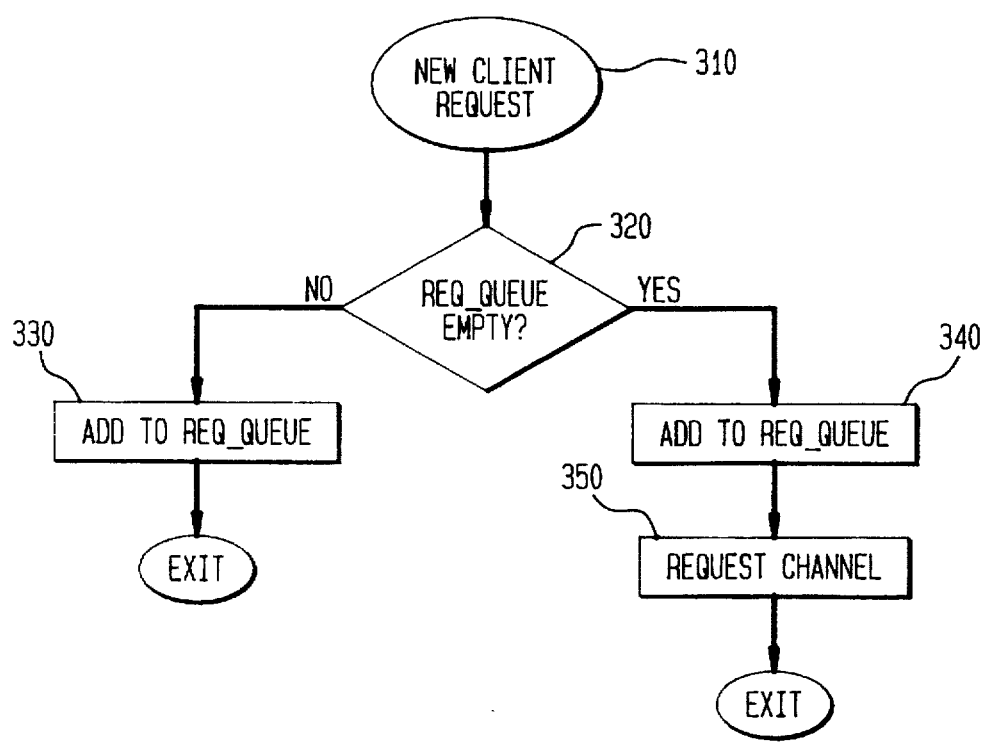
FIG. 3 shows the handling of a new request for a stream made by a client.

The handling of a new client request for start of a video is shown in FIG. 3. A client request is received by the LLS in step 310. In step 320 the LLS 220 checks if REQ_QUEUE is empty. If the queue is not empty then the new request is added to the REQ_QUEUE in step 330. Otherwise, the request is added to the REQ_QUEUE in step 340 and the LLS sends "Request channel" to the HLS in step 350.

Figure 4:
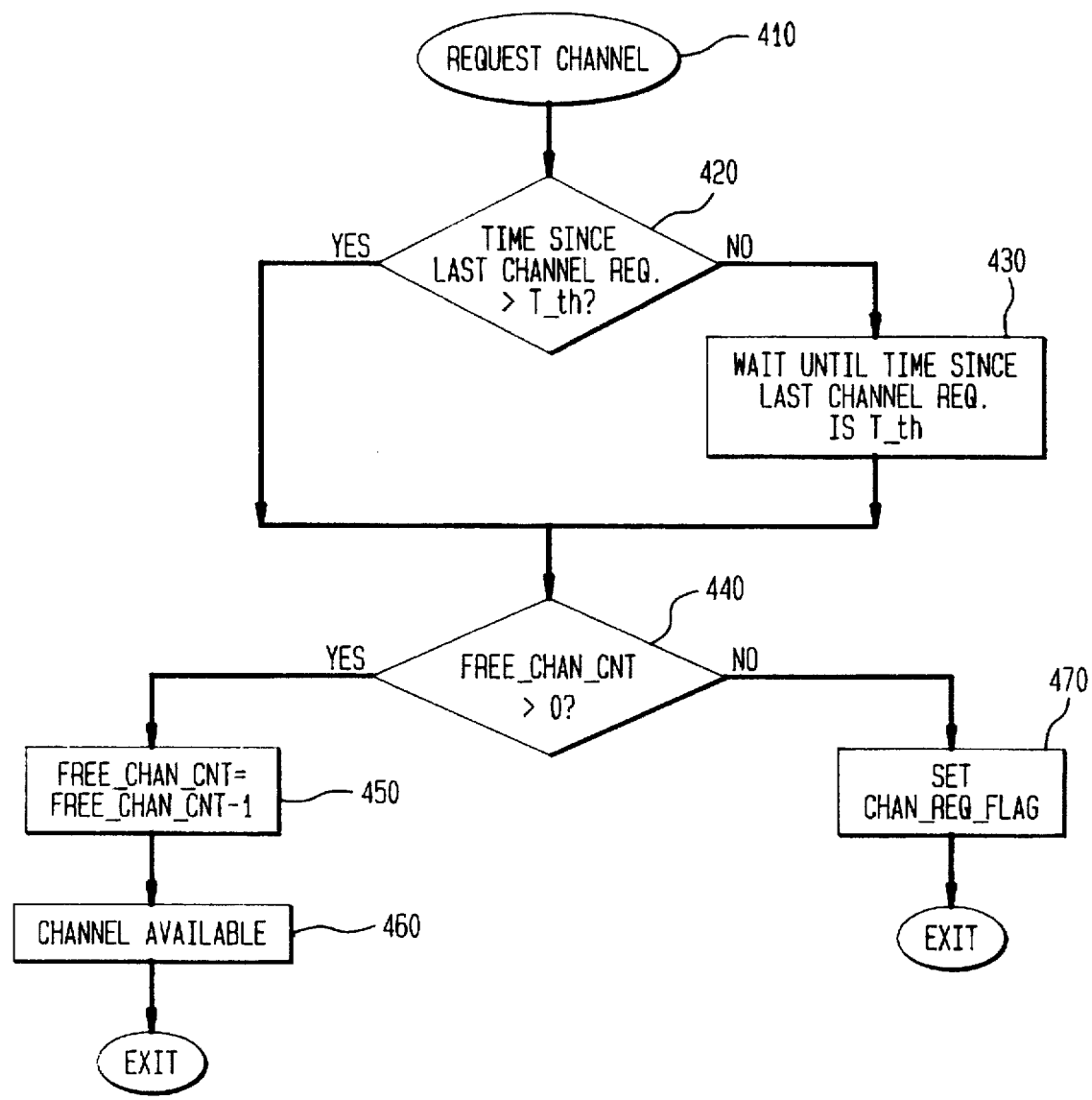
FIG. 4 shows the handling of a request for channel made by the lower level scheduler to the higher level scheduler.

The handling of "Request channel" by the HLS is shown in FIG. 4. In step 420 the HLS 210 checks to see if the time duration since the last time a channel was allocated to the LLS is greater than some prespecified threshold, T_th. In cases where little or no information concerning the future load is known, T_th is set to a fixed value. Preferably, this fixed value is the ratio of average holding time of a channel by the clients to the total number of channels in the VOD system. However, if the future load can be anticipated with more accuracy, then T_th can be made a function of the time of the day. If the time duration since the last time a channel was allocated to the LLS is not greater than T_th then the HLS waits for the remaining time in step 430. When the time duration since the last time a channel was allocated to the LLS becomes greater than T_th, in step 440 the HLS checks to see, if the FREE_CHAN_CNT is greater than zero. If not, in step 470 the HLS sets the CHAN_REQ_FLAG. Otherwise, in step 450 the HLS decrements the FREE_CHAN_CNT, and sends the signal "Channel available" to LLS in step 460.

Figure 5:
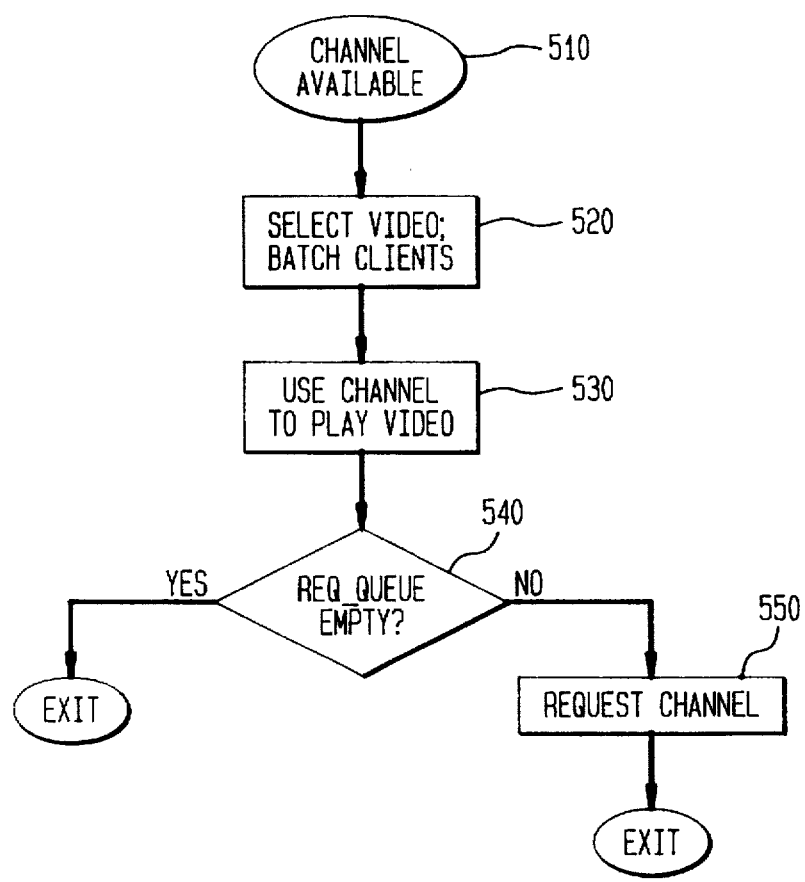
FIG. 5 shows the handling of the event of a channel allocated to the lower level scheduler; and, FIG. 6 shows the processing of the event of a channel freed by the video playback system.

The handling of "Channel available" by the LLS is shown in FIG. 5. In step 520 the LLS selects a video to play on the available channel depending on the waiting client requests, and batches all clients waiting for this video playback to start. In step 530 the LLS sends the signal "Use channel to play video" to the Video Player 230. Then, in step 540 the LLS checks to see if the REQ_QUEUE is empty after the batched clients are taken out of the queue. If not, in step 550 the LLS sends a signal "Request channel" to the HLS.

Figure 6:
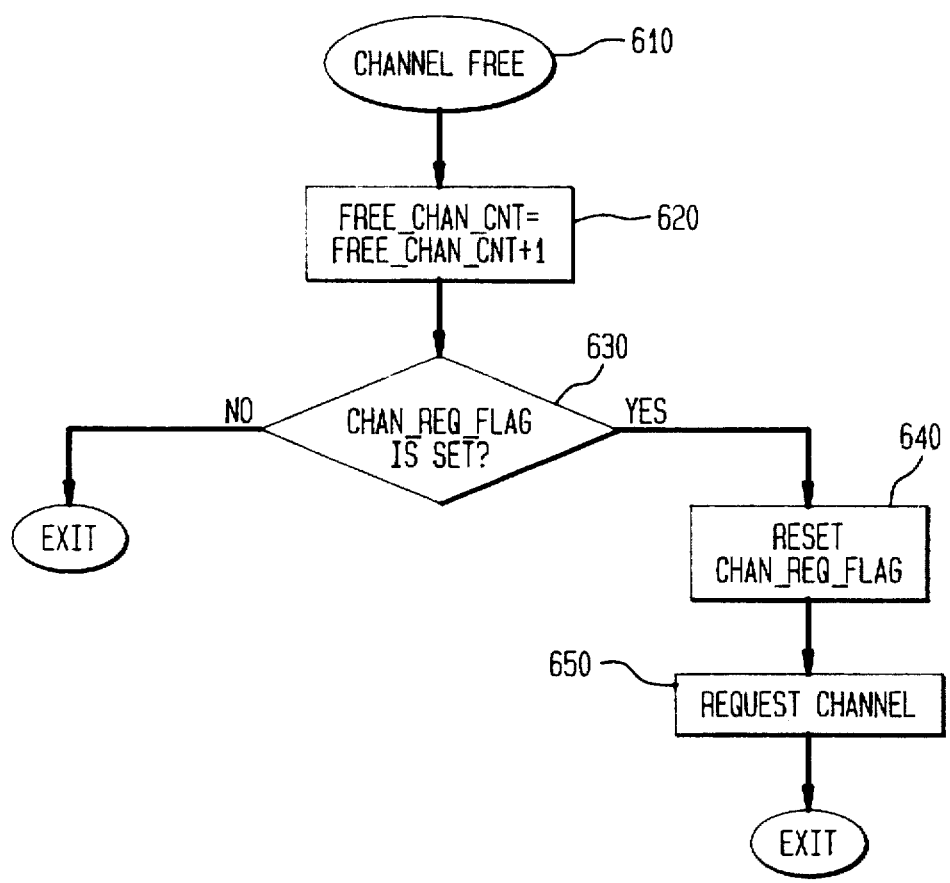

Finally, the handling of "Channel free" by the HLS is shown in FIG. 6. In step 620 the HLS increments the FREE_CHAN_CNT to reflect one more available channel. The HLS then checks to see, in step 630, if the flag CHAN_REQ_FLAG is set. If the flag is on, in step 640 the HLS resets this flag, and in step 650 the HLS processes the handling of signal "Request channel".

It should be understood that the present system and method can be employed to schedule events and physical resources other than videos. For example, the present system and method can be used to schedule physical resources in an on-demand customer service system of a type wherein a single resource can be used to satisfy multiple requests and wherein allocated resources can not be reclaimed until service completion (e.g. shuttle service).

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of scheduling videos in a video-on-demand system, comprising the steps of:
   receiving a plurality of requests from users of the system, for playing of the videos;
   determining a time at which a next playing of a video by the video-on-demand system will occur based on present availability of system resources and anticipated load on the system;
   selecting a particular video to play based at least in part on attributes of the requests which have not yet been serviced; and,
   after the selecting and when the time for the next playing arrives, playing the particular video to service at least some of the requests.

2. The method of claim 1, wherein the anticipated load on the system is determined as a function of at least anticipated new requests and anticipated completions of requests currently being served.

3. The method of claim 1, wherein the attributes are selected from a group including: a number of requests for a common video, waiting time for each of the requests, expected reneging threshold for the users and class of service.

4. The method of claim 1 wherein the determining a time at which a next playing of a video by the video-on-demand system will occur includes the step of determining whether a time period between a desired scheduling of a video and a previous scheduling of a video has exceeded a predetermined threshold; and, when the time period has not exceeded the threshold, postponing the playing until the threshold has been exceeded.

5. The method of claim 4 wherein the threshold is a fixed number.

6. The method of claim 4 wherein the threshold is determined based on a rate at which the load on the system is changing.

7. A method of scheduling videos in a video-on-demand system, comprising the steps of:

receiving requests for playing of videos from users of the system;

tracking the requests in a queue structure;

requesting use of system resources for playout of at least one of the videos identified by the requests in the queue;

responsive to the requesting, comparing an elapsed time between a last playing of a video and the requesting of the use of system resources to a threshold value;

when the comparing indicates that the elapsed time does not exceed the threshold value, postponing allocation of system resources to the request;

when the comparing indicates that the elapsed time exceeds the threshold value, allocating system resources to the request and playing out the at least one of the videos.

8. The method of claim 7 wherein the threshold is a fixed number.

9. The method of claim 7 wherein the threshold is determined based on a rate of which the load on the system is changing.

10. A method of scheduling physical resources in an on-demand customer service system of a type wherein a single resource can be used to satisfy multiple requests and wherein allocated resources can not be reclaimed until service completion, comprising the steps of:

receiving, from a user of the system, requests for allocation of the physical resources to the customer requests;

tracking the requests for allocation in a queue structure;

determining a time at which at least one of the physical resources will be next allocated based on both present availability of system resources and anticipated load on the system;

selecting a particular resource to allocate based on attributes of the requests in the queue.

11. A computer readable memory that can be used to direct a computer to schedule videos in accordance with a particular method when used by the computer, the method comprising the steps of:

receiving requests for playing of videos from users of the system;

tracking the requests in a queue structure;

determining a time at which a next playing of a video by the video-on-demand system will occur based on present availability of system resources and anticipated load on the system;

selecting a particular video to play based on attributes of the requests in the queue;

when the time arrives, playing the particular video; and, removing at least some of the requests served by the playing from the queue structure.

12. The computer readable memory of claim 11, wherein the anticipated load on the system is determined as a function of at least anticipated new requests and anticipated completions of requests currently being served.

13. The computer readable memory of claim 11, wherein the attributes are selected from a group including: a number of requests for a common video, waiting time for each of the requests, expected reneging threshold for the users and class of service.

14. The computer readable memory of claim 11 wherein the determining a time at which a next playing of a video by the video-on-demand system will occur includes the step of determining whether a time period between a desired scheduling of a video and a previous scheduling of a video has exceeded a predetermined threshold; and, when the time period has not exceeded the threshold, postponing the playing until the threshold has been exceeded.

15. The computer readable memory of claim 14 wherein the threshold is a fixed number.

16. The computer readable memory of claim 14 wherein the threshold is determined based on a rate at which the load on the system is changing.

17. A computer readable memory that can be used to direct a computer to scheduling video in accordance with a particular method when used by the computer, the method comprising the steps of:

receiving requests for playing of videos from users of the system;

tracking the requests in a queue structure;

requesting use of system resources for playout of at least one of the videos identified by the requests in the queue;

comparing an elapsed time between a last playing of a video and the requesting of the use of system resources to a threshold value;

when the comparing indicates that the elapsed time does not exceed the threshold value, postponing allocation of system resources to the request;

when the comparing indicates that the elapsed time exceeds the threshold value, allocating system resources to the request and playing out the at least one of the videos.

18. The computer readable memory of claim 17 wherein the threshold is a fixed number.

19. The computer readable memory of claim 17 wherein the threshold is determined based on a rate of which the load on the system is changing.

20. A video on demand system, comprising the steps of:

a network interface coupled to receiving requests for playing of videos from users of the video-on-demand system;

a memory having a queue structure formed therein, the queue structure including information indicative of the requests;

a first schedular instantiated in the memory, the first scheduling including: (i) means for selecting at least one of the videos for playout based on attributes of the requests indicated in the queue structure, and; (ii) means for requesting use of system resources for playout of at least one of the videos selected by the means for selecting;

a second scheduler instantiated in the memory the second scheduling including: (i) means responsive to the requesting, for comparing an elapsed time between a last playing of a video and the requesting of the use of system resources to a threshold value, and; (ii) means for allocating system resources to the request made by the means for requesting, when the comparing indicates that the elapsed time exceeds the threshold value; and, a video player coupled to the second schedular for playing the at least one of the videos.

\* \* \* \* \*